O. G. RIESKE.
GRAIN DRILL.
APPLICATION FILED MAY 24, 1910.
1,061,499.
Patented May 13, 1913.
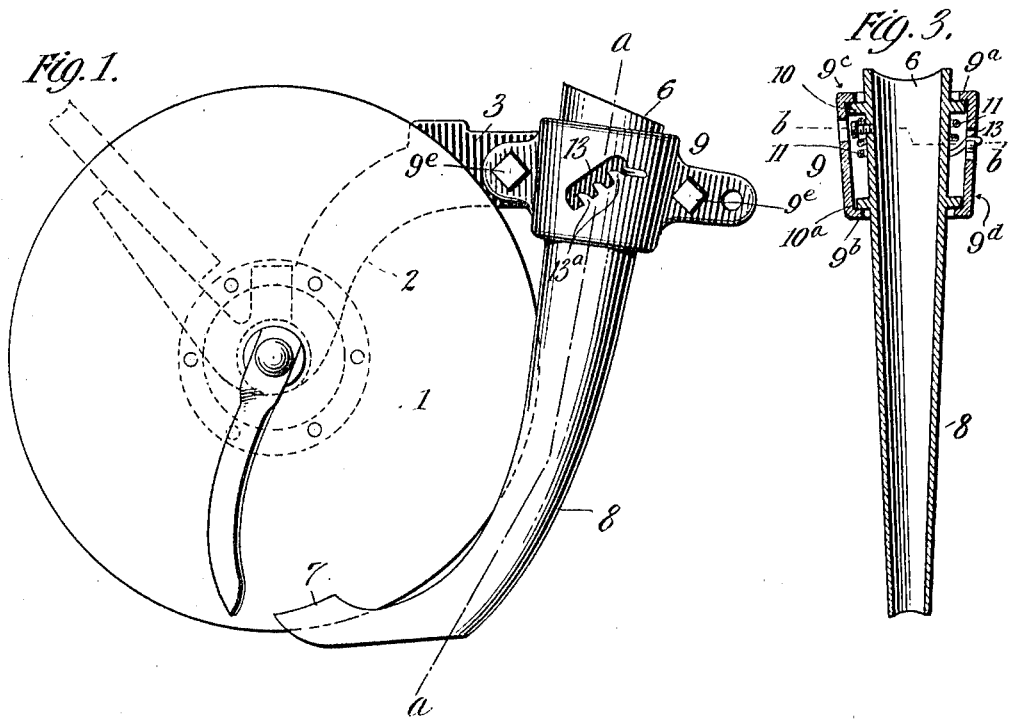
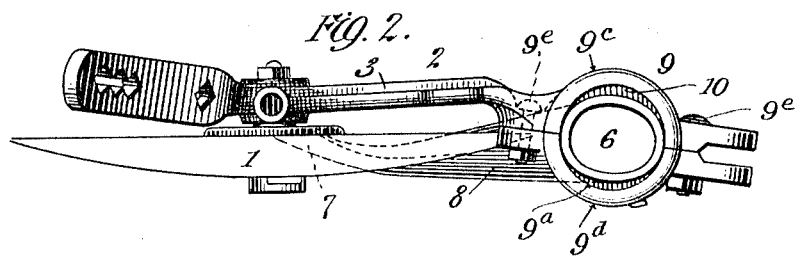
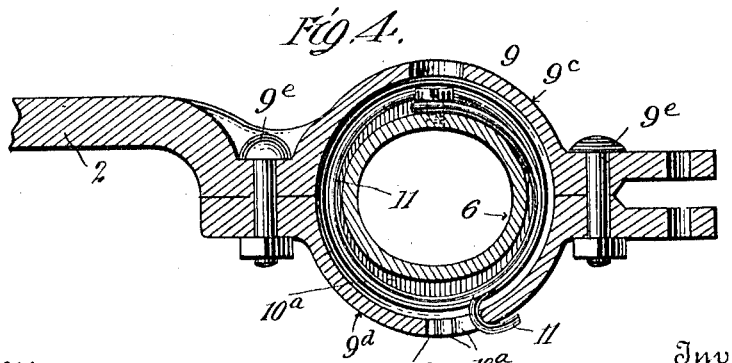
Witnesses:
Inventor
O. G. Rieske
By his Attorney
Philip T. Dodge

UNITED STATES PATENT OFFICE.

OTTO G. RIESKE, OF ST. LOUIS PARK, MINNESOTA, ASSIGNOR TO MONITOR DRILL COMPANY, A CORPORATION OF MINNESOTA.

GRAIN-DRILL.

1,061,499.  Specification of Letters Patent.  Patented May 13, 1913.

Application filed May 24, 1910. Serial No. 563,110.

*To all whom it may concern:*

Be it known that I, OTTO G. RIESKE, of St. Louis Park, county of Hennepin, and State of Minnesota, have invented a new and useful Improvement in Grain-Drills, of which the following is a specification.

This invention relates to grain drills of the type in which the furrows to receive the seed are formed by opening disks, and in which the seed is directed into the furrows by seed tubes or conduits mounted with their delivery ends contiguous to the side of the disks.

The invention has special reference to the mounting of the seed tube relative to the disk, and consists primarily in so sustaining the tube that it may oscillate or swivel on its longitudinal axis, whereby its toe may be caused to move to and from the disk, means being provided for holding the toe in yielding engagement with the disk.

In the accompanying drawings: Figure 1 is a side elevation of a disk-opener and seed tube or conduit constructed in accordance with my invention. Fig. 2 is a top plan view of the same. Fig. 3 is a vertical longitudinal sectional elevation on the line $a$—$a$ of Fig. 2. Fig. 4 is a horizontal section on the line $b$—$b$ of Fig. 3.

Referring to the drawings an opening disk is mounted to rotate on a frame 2, which, in the present instance, is in the form of a supporting arm 3 extending forwardly and downwardly, the disk being rotatably mounted on the lower end of the arm in any suitable manner, and the arm being adapted to be connected with the drag-bar shown by dotted lines in Fig. 1.

The disks are usually mounted in gang in the seeding machine, the drag bars being connected at their forward ends with the machine frame so as to apply the necessary draft, and the disks being so mounted that they will extend at an angle with reference to the line of travel.

The supporting arm 3 carries at its upper end an upright seed-tube 6, the upper end of which is adapted to receive the seed to be planted, while the lower delivery end or toe of the tube is arranged alongside of and in contact with the convex face of the disk, whereby the seed will enter the furrow formed by the disk.

It is important for the proper and effective deposit of the seed uniformly and with certainty in the furrow, that the delivery end of the tube maintains close contact with the face of the disk, and in order that this result may be accomplished, notwithstanding any irregularity or unevenness that may exist in the form or surface of the disk, or its rotation, I so connect the seed tube with the supporting arm that the former may oscillate on its longitudinal axis, the delivery end or toe of the tube being extended laterally, as at 7, from the main or body portion 8, so that when the tube oscillates, its toe will swing to and from the disk. The construction which I prefer to adopt in effecting this action of the seed tube, is to provide the upper end of the arm with an upright bearing or socket 9, in which the upper end of the tube is loosely mounted in such manner that it may turn or swivel therein, the interior of the socket being formed at its upper and lower ends with inwardly extending annular shoulders $9^a$ and $9^b$, against which respectively abut, upper and lower external shoulders 10 and $10^a$ on the seed tube, this construction permitting the tube to turn freely in the socket on a longitudinal axis, while preventing the same from escaping endwise from the same. The outer edges of the shoulders fit closely within and bear against the interior of the socket 9, and in this manner prevent the tube from wabbling in its swiveling motion, so that the proper operative relation of the toe of the tube to the disk will be maintained.

The tube is so sustained in its socket that its laterally extending toe will bear on the convex surface of the disk, the oscillation of the tube causing the toe to swing to and from the disk; and in order that the toe will be held in yielding contact with the face of the disk, I provide a torsional spring 11, which is coiled around the tube within the socket, with one end fixed to the tube, as at 12, and its opposite end extending through a diagonal opening 13 in the wall of the socket, and engaged with one of a series of teeth $13^a$ on the edge of the opening, the said teeth being spaced apart in a direction circumferentially of the socket. The spring applied in this manner, will tend to turn the tube on its longitudinal axis in a direction to hold the toe against the face of the disk. By engaging the end of the spring with the different teeth, its tension may be varied, and the pressure of the toe against the disk correspondingly varied.

By means of the construction shown and described, it will be seen that the laterally projecting toe of the tube by being maintained in close contact with the disk's surface, will cause the seed to be delivered into the furrow with uniformity and certainty, and without danger of being thrown aside, as might occur if the disk failed to revolve in an even path, or if irregularities existed in the surface of the same. Further, it will be seen that by the capability of the tube to oscillate in its socket, and by the action of the spring in holding the toe of the tube in contact with the disk, the toe will be caused to follow faithfully any irregularities in the disk's surface, and in this manner preserve close contact therewith.

In order to permit the assembling of the tube in its socket, the latter is formed in two separable sections 9$^c$ and 9$^d$, the section 9$^c$ being fixed to the supporting arm 3, and the section 9$^d$ being connected detachably with section 9$^a$ by means of fastening bolts 9$^e$ passing through ears on the sections.

While I have in the accompanying drawings shown my invention as embodied in the form which I prefer to adopt, and which has been found in practice to answer to a satisfactory degree the ends to be attained, it will be understood that the invention is not to be limited to any particular details of construction except in so far as such limitations are specified in the claims.

Having thus described my invention, what I claim is:—

1. In a grain drill and in combination with a support or frame provided with an upright socket, an opening disk sustained by said support, a seed tube mounted in the socket in the support to swivel around the longitudinal axis of the tube, and means for holding said tube against endwise motion in both directions, said means serving also to guide the tube in its swiveling motion.

2. In a grain drill and in combination with a support or frame provided with a socket having a plurality of teeth spaced apart in a direction circumferentially of the socket, an opening disk sustained by the support, a seed tube mounted to swivel in the socket, and a spring encircling the tube within the socket with one end connected with the tube and its opposite end adapted to be engaged with any of the notches in the socket; whereby the tension of the spring may be adjusted.

3. In a grain drill and in combination with a frame or support provided with a socket having inwardly extended shoulders at its upper and lower ends, an opening disk sustained by the support, and a seed tube mounted to swivel in said socket, said tube being provided with outwardly extending flanges in position to abut against the said shoulders and bear against the interior of the socket, whereby endwise motion of the tube within the socket will be prevented and it will be guided in its swiveling motion.

In testimony whereof I hereunto set my hand this 18th day of May, 1910, in the presence of two attesting witnesses.

OTTO G. RIESKE.

Witnesses:
A. B. ALLEN,
F. S. PRESTON.

---

Copies of this patent may be obtained for five cents each, by addressing the "Commissioner of Patents Washington, D. C."